(12) United States Patent
Bowman et al.

(10) Patent No.: US 11,496,780 B2
(45) Date of Patent: Nov. 8, 2022

(54) SYSTEM AND METHOD FOR PRODUCTION, DISTRIBUTION AND ARCHIVAL OF CONTENT

(71) Applicant: FUTURI MEDIA, LLC, Seven Hills, OH (US)

(72) Inventors: Craig Bowman, Durand, MI (US); Daniel Anstandig, Bay Village, OH (US)

(73) Assignee: FUTURI MEDIA, LLC, Seven Hills, OH (US)

( * ) Notice: Subject to any disclaimer, the term of this patent is extended or adjusted under 35 U.S.C. 154(b) by 0 days.

(21) Appl. No.: 17/387,085

(22) Filed: Jul. 28, 2021

(65) Prior Publication Data

US 2021/0400320 A1 Dec. 23, 2021

Related U.S. Application Data

(62) Division of application No. 16/127,447, filed on Sep. 11, 2018, now Pat. No. 11,109,075.

(60) Provisional application No. 62/556,703, filed on Sep. 11, 2017.

(51) Int. Cl.
| | | |
|---|---|---|
| *H04N 21/234* | (2011.01) | |
| *H04H 60/02* | (2008.01) | |
| *H04N 21/2187* | (2011.01) | |
| *H04N 21/422* | (2011.01) | |
| *H04N 21/442* | (2011.01) | |
| *H04N 21/643* | (2011.01) | |
| *H04N 21/81* | (2011.01) | |
| *H04N 21/845* | (2011.01) | |

(Continued)

(52) U.S. Cl.
CPC ...... *H04N 21/23424* (2013.01); *H04H 60/02* (2013.01); *H04N 21/2187* (2013.01); *H04N 21/42203* (2013.01); *H04N 21/44204* (2013.01); *H04N 21/64322* (2013.01); *H04N 21/812* (2013.01); *H04N 21/8455* (2013.01); *H04H 20/82* (2013.01); *H04H 60/37* (2013.01)

(58) Field of Classification Search
None
See application file for complete search history.

(56) References Cited

U.S. PATENT DOCUMENTS

| 6,615,039 B1 | 9/2003 | Eldering | |
|---|---|---|---|
| 2002/0053078 A1* | 5/2002 | Holtz | H04N 21/4782 348/E5.022 |
| 2002/0092019 A1 | 7/2002 | Marcus | |

(Continued)

FOREIGN PATENT DOCUMENTS

WO 2016166764 A1 10/2016

*Primary Examiner* — Omar S Parra
(74) *Attorney, Agent, or Firm* — Hudak, Shunk & Farine Co. LPA

(57) ABSTRACT

The present invention provides to a web-based software and hardware system that act together with a user device to capture an audio feed, to easily encode and add meta data to the audio content using input from studio systems, parse the content based on its type, and to provide the means to incorporate a feed segment produced from the encoded audio feed into a secondary production which is used to provide an indexed archive of audio and on-demand broadcast content, for example, by the creation and publication of pod-casts or on-demand broadcast, which includes ad positions inserted and dynamically served.

5 Claims, 4 Drawing Sheets

(51) Int. Cl.
 *H04H 20/82* (2008.01)
 *H04H 60/37* (2008.01)

(56) References Cited

U.S. PATENT DOCUMENTS

| | | |
|---|---|---|
| 2007/0124789 A1 | 5/2007 | Sachson et al. |
| 2007/0242880 A1 | 10/2007 | Stebbings |
| 2007/0288978 A1 | 12/2007 | Pizzurro et al. |
| 2009/0287987 A1 | 11/2009 | Alles et al. |
| 2011/0099250 A1 | 4/2011 | Littlejohn et al. |
| 2011/0202967 A1* | 8/2011 | Hecht ................ H04N 21/854 |
| | | 725/114 |
| 2012/0096357 A1 | 4/2012 | Folgner et al. |
| 2012/0166289 A1 | 6/2012 | Gadoury et al. |
| 2014/0223475 A1 | 8/2014 | Mcintire et al. |
| 2015/0062353 A1 | 3/2015 | Dalal et al. |
| 2015/0092106 A1 | 4/2015 | Savare et al. |
| 2018/0069910 A1 | 3/2018 | Her et al. |
| 2019/0281334 A1 | 9/2019 | Pizzurro et al. |
| 2019/0306574 A1 | 10/2019 | Eccles et al. |
| 2019/0313141 A1 | 10/2019 | Armstrong et al. |
| 2019/0342618 A1 | 11/2019 | Dudko |

* cited by examiner

FIG. 4

SYSTEM AND METHOD FOR PRODUCTION, DISTRIBUTION AND ARCHIVAL OF CONTENT

FIELD OF THE INVENTION

The present invention relates to a web-based or downloadable software and hardware system and method for their use, that act together to record, encode, parse, archive, transcribe, package, index and validate content, such as broadcast audio. Further the invention is used to produce on-demand broadcast content for distribution such as on social media, RSS, and to create sharable content for example, by the creation and publication of pod-casts or on-demand broadcast based on a streaming feed.

BACKGROUND OF THE INVENTION

Traditionally broadcast radio related to audio content provided "over the air" which included content broadcast through a highly regulated industry at specified wavelengths and requiring receivers tuned to receive a specific signal. The radio broadcast industry grew-up within this paradigm which originally included predominately live production of content, and which has strived to retain the audience excitement provided by real-time broadcast as it is evolved to incorporate pre-recorded or pre-programed content. Audiences have had limited access to previously broadcast content, subject to what was available in real-time over the air.

One of the ways that broadcast radio has evolved is through the acceptance of internet radio (also web radio, net radio, streaming radio, e-radio, IP radio, online radio) which is an audio service transmitted via the internet or web. Broadcasting on the Internet is usually referred to as webcasting since it is not transmitted broadly through wireless means (but of course, can be transmitted by means of local area networks or LAN). Internet radio involves steaming media which presents listeners with a continuous stream of audio that typically cannot be paused or replayed, much like traditional broadcast media; in this respect, it is distinct from on-demand file serving and pod-casting which generally involve downloading the content, such as from captured servers, or from the cloud. Internet radio services typically offer content formats available from traditional broadcast radio stations (i.e. terrestrial radio stations), such as various genres of music, sports, news and talk and may be associated with a traditional broadcast station or may be a stand-alone station.

Traditional broadcast radio spends billions of dollars creating millions of hours of creative audio content that is only used once. Generally this happens in the context of a portion of a show involving broadcast talent (i.e., a disc jockey or "DJ"), including, for example, a live audio or audio and video stream, typically created in analog form, that is captured by means of a microphone and studio production equipment for simultaneous broadcast or for capture as a file, and later broadcast as is, or subsequent to editing. In the past, the stream is a linear stream. While the period for such streams within an hour or two hour show may include breaks for commercial interruption, the length of the streaming periods renders them virtually useless to rebroadcast as clips of less than 2 minutes, for example, since the content is un-searchable and un-cataloged. Even at this, broadcast automation systems generally do not identify such useable periods.

The present invention is designed as a system that allows broadcast talent, such as the production manager or DJ and/or a user including a station administrator, to instantly (including in real-time) mark, such as by marking or encoding using a marker, (such as a tone, a General Purpose Input/Output (GPIO), a virtual marker, or other energy wave form), a desired portion of the stream and to automatically decode, convert, parse, sort, and compile, combine or edit all of or portions of the streaming broadcast content (as clips) and to preserve or incorporate selected advertising material according to preset instructions entered into the system software by an administrator, for example entered using a dashboard on a display device to access a sub-program which directs the system to act automatically for present or future production (termed herein "user enabled instructions") into an secondary experience, including an on-demand experience. Thus, the invention allows broadcasters to leverage the streaming experience and to easily capitalize on the additional audience and advertising revenue opportunities for the pod-cast or on-demand audio markets, as well as through social media. In addition, the invention allows for a "proof of performance" or validation of the listener or more broadly audience experience of content by tabulating or indexing the quantity of advertising material served into a secondary production and the quantity and quality of distribution, for example on a station web-site, through downloads, or through social media.

The system includes an encoder or marker, which marks the recorded stream using an in-audible tone, GPIO, virtual placeholder or book mark (herein meaning a indicator which is generally not detectable to the ultimate audience, but can be detected by the user or editor) so as to "book mark" a portion of a recording between breaks. In addition, a "touchscreen" is included, for example, a tablet including a dedicated dashboard that presents the feed stream as a visual, such as a waveform which may be marked by time and expandable to show the details of the audio feed and with a touch or click initiated activator for the encoder including an "easy button" which is optionally a mechanical button or a touch simulation on the tablet and which on-air talent can use to generate a feed clip from the live audio stream. The feed clip is subsequently combined by the software and hardware production portion of the invention, such as into a prepared template optionally accessible and manipulatable through a broadcast station automation system or the display associated therewith. The feed clip can be combined in the production system production with additional material again in accordance with pre-set administer or "user enabled instructions". The additional material includes transcription, music or other audio selections, promotional material and advertising, and associated "metadata" to produce an instant on-demand segment or pod-cast, (i.e., "a secondary production") from a last talked break. Thus, in a matter of seconds, stations can take a live show segment and turn it into a pod-cast on social media, including iTunes, Facebook, Twitter, the station web-site and a number of other platforms, such as iHeartRadio, ITunes, and similar services.

In certain aspects of the technology disclosed, the production system may be configured to incorporate a feed clip into a secondary production by including one or more of promotional material advertisements using an ad invocation. In certain aspects, the production system is configured to invoke an external advertisement service to provide, including to automatically provide without human intervention at this point in the process, and based on a call/request/ad invokation based on user enabled instructions entered using a touch display and/or keyboard to access a software program that instructs the system to act. In this case, the supplemental material is provided to the production system with at least one promotional material advertisement which is included, e.g. automatically included, in the secondary production by the production system according to pre-set criteria entered through the software or live time prior to distribution. In certain aspects, external advertisement service may be invoked by the production system according to a set of user enabled production instructions in form of machine readable code executed by, or available to, the production system. In the context of the system and methods of the technology disclosed, user enabled production instructions may be a sub-program which is configured to securely direct the system to act automatically for present or future production and/or distribution.

The content is gathered from analog or digitally encoded real-time audio which includes embedded markers to facilitate parsing or indexing or organization of the content, and which can be combined and transmitted with further information, content or data, including metadata, to form revitalized content or compilation as a secondary production for further distribution and publication or broadcast. The act of parsing produces a segmented feed stream which typically has from 0.25 to 30, and preferably from 0.5 to 10, and most preferably 5+/−2 second segments. The length of the segments can be determined based on the internet speed and the content so that the segment provides an amount of material appropriate for communication and download. The further included information or "metadata" is data or information that provides information about other data such as generalized information about music artist or licensing information or in the case of ad invocation, about the advertising material.

The content may also be available or made available via a web-based interface for searchable access by the broadcaster, their affiliates, or audience. The system further provides on-air talent, and producers with the ability to mark selected content (in and out) control content, zoom in and out, fade, combine and layer audio, and visual content, use templates, such as for recurring content, and edit items that can also be set to default, including, for example, title, description, images, and bumpers so as to enable the talent to post, publish or broadcast by simply editing the audio feed and clicking to post.

The production and distribution system of the technology disclosed may include a streaming transmitter having an architecture that includes hardware and software, where the software system may be a machine bearing machine readable code that may be interfaced by automated administrator or a live administrator using a touch screen and/or a keyboard.

SUMMARY OF THE INVENTION

The present invention provides content, such as an audio data file, for the creation, transmission, storage and distribution system with a production system or subsystem that allows the real-time marking or even selection (for example, in real time) of content including both analog and digital content, using a marking device that encodes the mark from a selected selection edited in real-time from a larger content stream. The invention further provides for the integration of a streaming transmitter in which a hardware marker or encoder at a local station presents an audio data file analog to an analog to digital converter.

The marked segment selection is subsequently displayed on a display screen or presented as part of production that may be at least one of parsed, decoded, filed, stored and marked for further use in the production subsystem, which may automatically edit and include the selection in combination with internally or externally provided material (i.e., by a live administrator, and automated system or an external advertising service that stores and delivers ad content) that is similarly filed, stored and marked as to content, such as promotional material, or commercial material, or even including video content or visual content. The marked selection may also be transcribed and the transcription can be used, for example for archiving, indexing, or searching. The production subsystem enables a producer (i.e., a human or machine-based decision maker, including a broadcast station automation system) to create new content events or secondary production, and more specifically, audio-based events (which may include embedded graphic or video content), such as on-demand segments or pod-casts which represent sequences of audio with additional information, such as meta-data or other information, includable searchable information or analytics for cataloging purposes and which optionally, may be formatted and distributed according to pre-selected criteria, including for example demographics and which are subsequently used as directed in subsequently broadcast, pod-cast or on-demand application.

File storage and communication is secure and takes place behind protective means with appropriate secure measures including, for example, fire-wall and/or encryption protocol, and the invention provides for library services with respect to the initial content and for the edited version as well. An example of a mechanism for accomplishing this includes HTTP Live Streaming (HLS) style manipulation, but used for audio or audio and video, in which HTTP file transfer technology is used to transfer the feed segments to the cloud or other secure remote or in-house file locations. The communication and file resides in the cloud and is accessible using secure communication means optionally accessible by the service provider and by the content provider.

BRIEF DESCRIPTION OF THE DRAWINGS

FIG. 4 is a view of the dashboard showing the view of a waveform of the feed stream of the present invention.

DETAILED DESCRIPTION OF THE INVENTION

Figure 1:
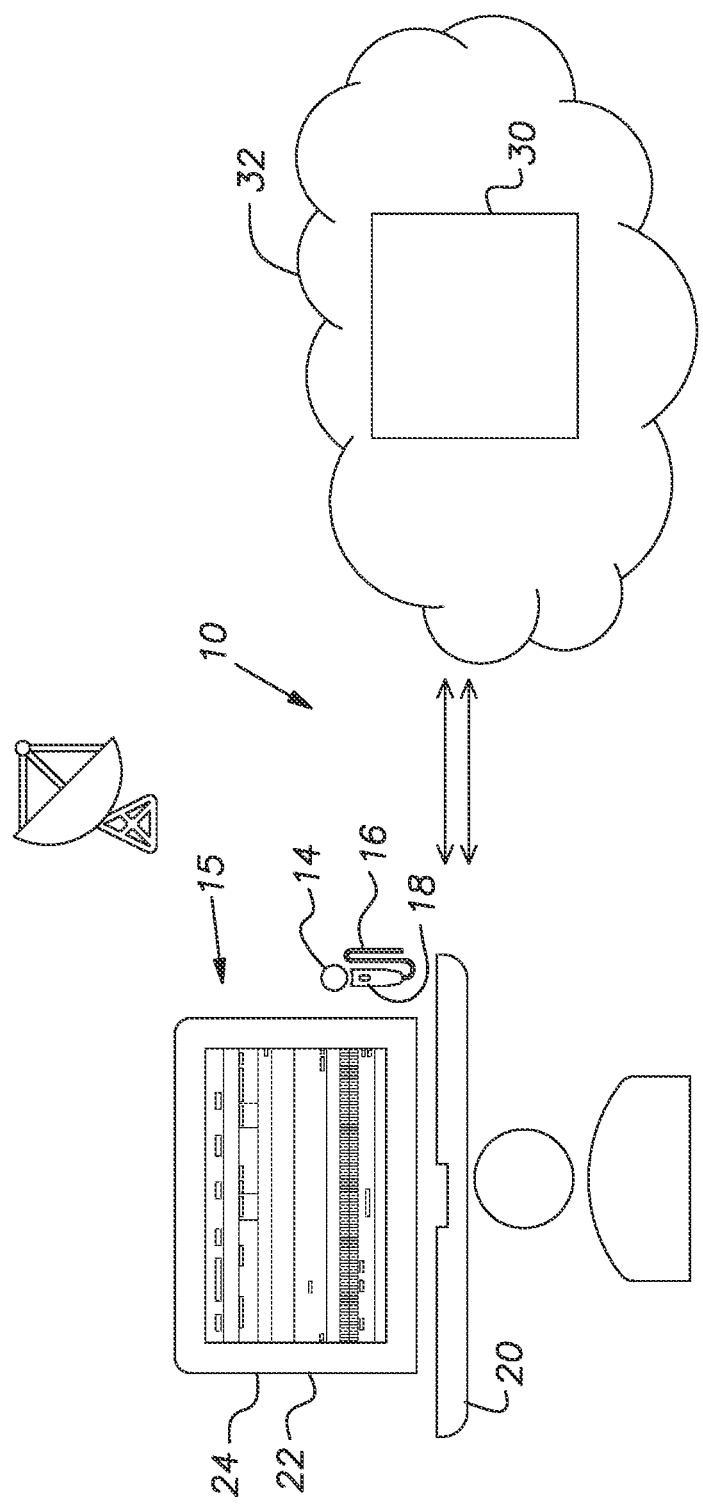
FIG. 1 is a schematic view of the invention.

FIG. 1 shows a schematic view of the production system in accordance with the present invention in the context of the interaction between the external stream source, i.e., the broadcast station or broadcast automation system, and specifically, the secondary product production system, and the content provider feed stream or broadcast automation system. While the invention is described with respect to a separate and external secondary production system (i.e. which is implemented and managed apart from the broadcast station), it should be understood that the stream and production system source can be internal to the broadcast station and operate as part of the automation system and where the link of the present invention is used as a platform or mechanism to import either files external to the, file system, and/or automation system or to determine content to be placed into a file or location in existence in the automation system playlist or selection sequence. File storage and communication is secure and may take place behind with appropriate secure measures including, for example, firewall and/or encryption protocol, and the technology disclosed may also provide for library services with respect to the initial content and for the edited version as well. As mentioned-above, example mechanisms for accomplishing this include HTTP Live Streaming (HLS) style manipulation, but used for audio or audio and video, in which HTTP file transfer technology is used to transfer the feed segments to the cloud or other secure remote or in-house file locations. HLS is an HTTP-based media streaming communications protocol that works by breaking the overall stream into a sequence of small HTTP-based file downloads, each download loading one short chunk of an overall potentially unbounded transport stream.

By way of non-limiting example, various components are described and shown, which may perform various functions and interact with each other. These components may be segregated based on their function merely for the sake of description and may represent computer hardware and executable software code which may be stored on a computer-readable storage medium for execution on appropriate computing hardware or mobile devices. The various functions of the different components may be combined or segregated as hardware or software stored on a computer-readable medium in any manner, and may be used separately or in combination.

Figure 2:
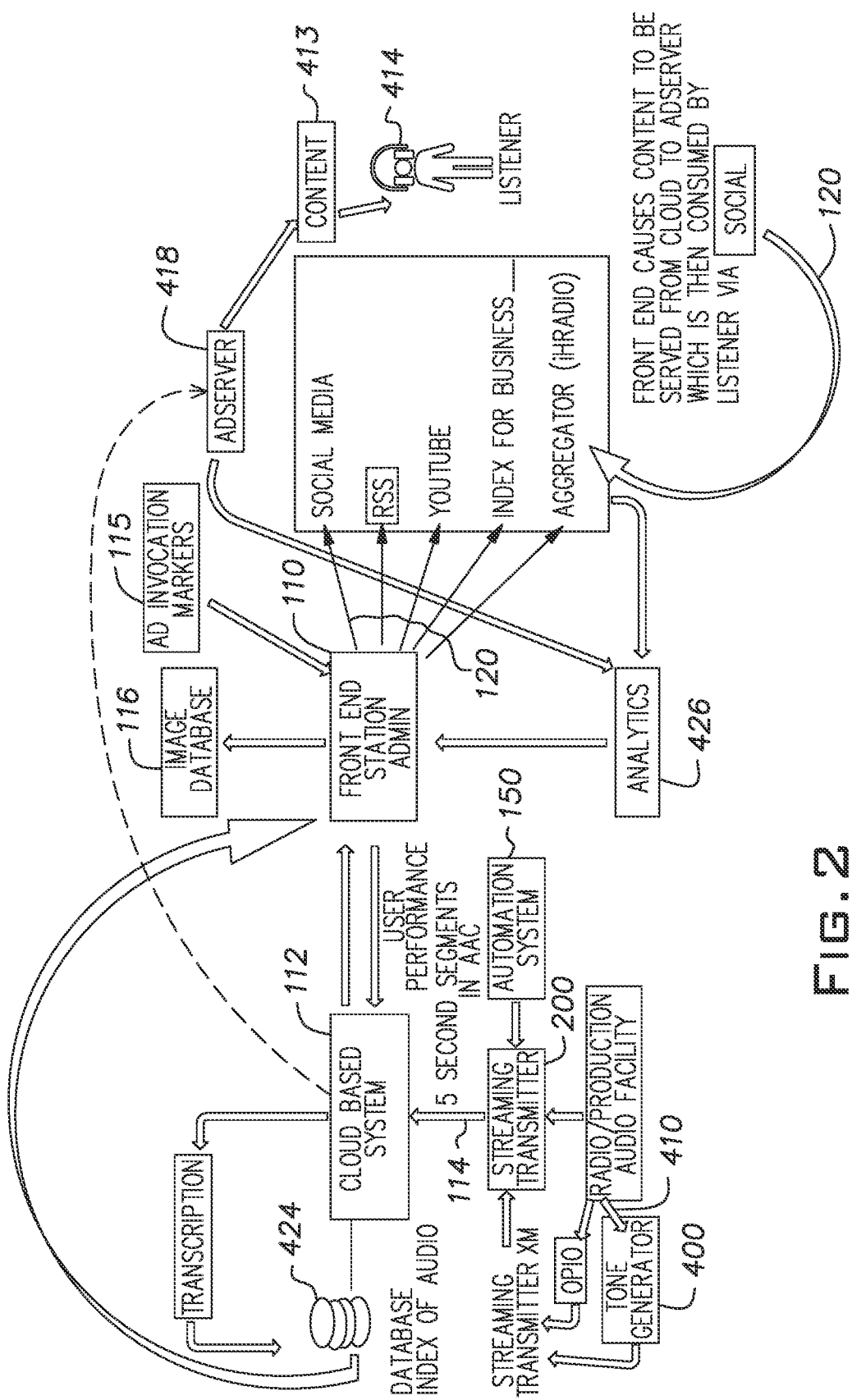
FIG. 2 is a schematic view of the system components.

The present invention provides a system for creating and providing a downloadable secondary production to a presentation device of a user, and the system 10 includes a capture system 12 which is exposed to a feed stream 14, such as a live talk break of a broadcast radio station 15. The capture system 12 has a encoder which is a GPIO device, such as an encoder or microphone 16 that is activated, for example by a kill switch 18 pressed to on to begin a recording session and to off to end a recording session. Other marking systems could also be used, including a undetectable marked transmission of noise, or lightwaves. The capture system thus records talk breaks as a linear feed stream, which can be converted to digital stream or recorded as analog. The system further includes an encoder 20 which in this case is enabled by a controller, i.e. a tablet computing device 22, which also has a web-based administrative control panel controlled using user based instructions, and typically displayed on a dashboard 24 (i.e., an admin panel and which may be secure such as by firewall and other software and passcode protections), FIG. 2 illustrates the components of an example implementation of the present system 100 which is accessed through a front-end user 110, or station administrator which or who enters criteria to control variables within the production process. In this implementation, a cloud based production system 112 is linked through the internet to a feed stream 114 and receives an encoded feed stream 116 which has been marked and thereby parsed, for example using the microphone with a kill switch, where the encoder will mark the feed stream in 0.25-30, and preferably 0.5 to 10, and most preferably 5+/−2 second segments for later use. The production system illustrated in FIG. 2 may be configured to act on the marked segmented feed stream by indexing, and transcribing the feed segments which are linked back to the station administrator 110 which may add supplemental material including visual material such as jpegs, pdf, video, or advertising material using an image data base 116 and/or an ad invocation service 118. In example embodiments, at least one of the image database and the ad invocation service is part of a content insertion system which is linked to the production system and which is configured to incorporate additional content to the secondary production. An analytic system 130 may also be linked to the distribution system 120. The analytic system 426 may account for the content insertion into the secondary production. The production component in FIG. 2 may be linked to a distribution system 120 which is directed by the station administrator where to distribute the secondary production (i.e. the material represented by the selected marked segments and added additional material including the visual material, advertising material, and metadata). The distribution system directs the secondary production to locations which can be accessed by the ultimate audience member on a mobile, lap-top or desk-top or other dedicated device, i.e., through a broadcast station web-site, pod-cast, or through social media services. In certain aspects of the technology disclosed, the front-end 110 may cause content to be served from the cloud-based production system 112 directly to an ad server 418, which is then consumed by listener via social media. An ad server is typically a web server that stores advertising content used in online marketing and delivers that content onto various digital platforms such as websites, social media outlets and mobile apps. An ad server is merely the technology in which the advertising material is stored and is the means of distributing that material into appropriate advertising slots online.

Figure 3:
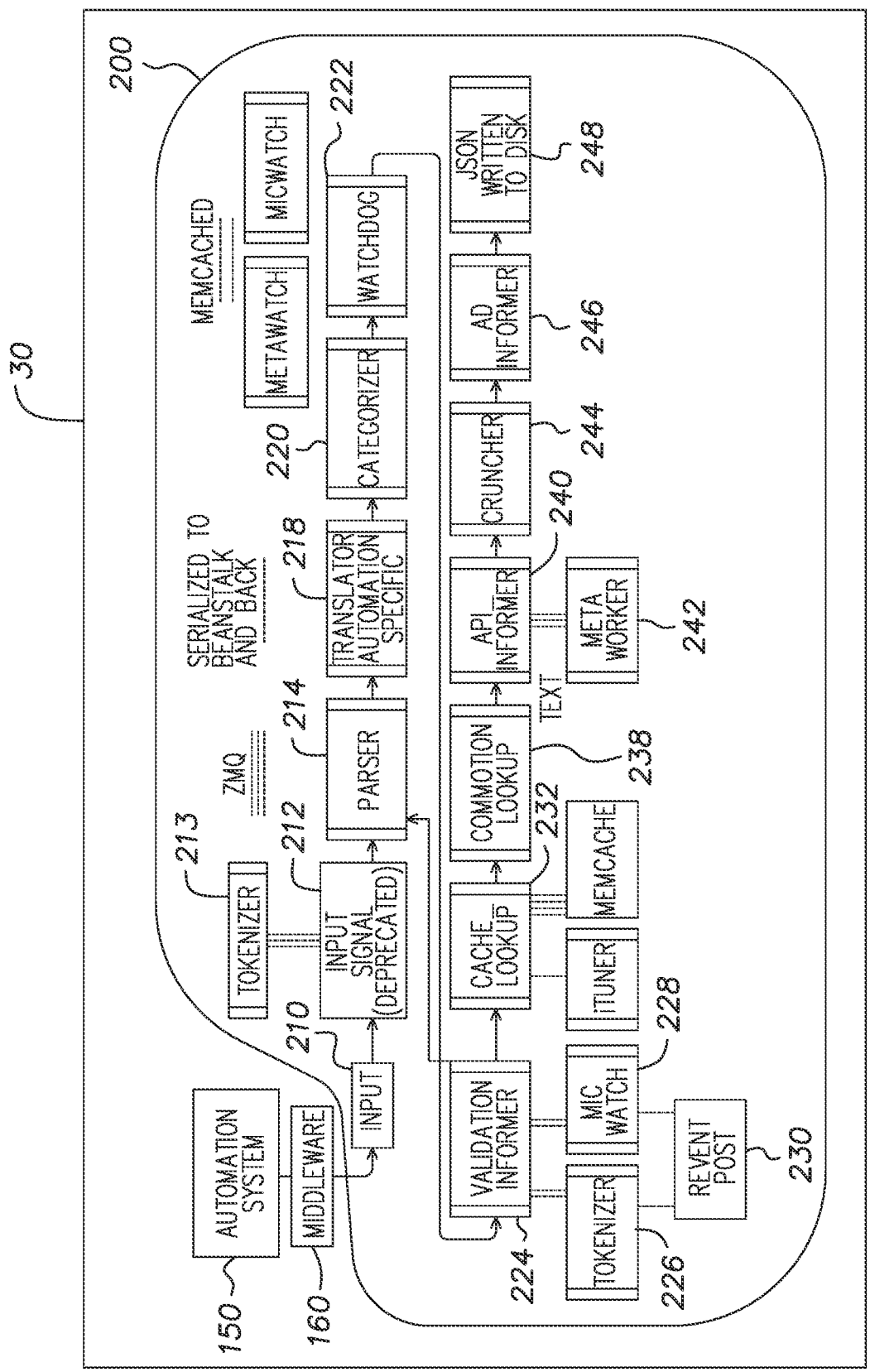
FIG. 3 is a flow chart of the streaming transmitter of the present invention.

FIG. 3 illustrates a streaming transmitter system 200 that interfaces with a broadcast automation system 150 by a middleware system 160 and for use with the systems shown in FIG. 2, and comprises an input 210 that receives analog audio and AOPIP through Livewire and NOW PLAYING information, which includes UDP, such as raw text and XML, and TCP, such as raw text and XML. This is fed to a Input signaler 212 which validates the Now Playing input signal through a tokenizer 213 and forwards it to a Parser 214 which acts to parse the NOW PLAYING or metadata into items such as title, artist, automation ID, length in seconds, automation category, aired time and album art. This information is fed to a Translator 218 which translates the automation categories into groups, where the automation system may have several categories used for music and the categories are associated with a group named Music. The Categorizer 220 takes the translated groups and categorizes them as to whether they should take priority of the subsequent group. For example, if an announcer is talking and a song starts before the microphone is turned off, the beginning of the song segment is pushed, in time, until the microphone GIPO is turned off. The Watchdog 222 uses logic to detect talk breaks/phone calls/non-automation events when there is no GPIO present. The validation informer 224 communicates with a tokenizer 226 and a mic watch 228 and REvent POST 230 to filter superfluous or unused material. A cache look-up 232 communicates with iTunes and a memcache for streaming and Peds the material to Commotion look-up 238, a third party integrator for streaming audio or video material, which communicates with an API informer 240 that has a metaworker 242 and acts to communicate information, including album art, metadata and mic events to the POST system. A cruncher 244 creates a JSON blob of all of the metadata and sends it to the server. An ad informer 246 changes the state of a bit in a frame header to indicate that it is a portion of the stream which can be replaced by an external system for streaming. The JSON written to disk service 248 is used for streaming metadata and synchronization and the ReVent POST forwards raw data events to the API for processing.

Figure 4:
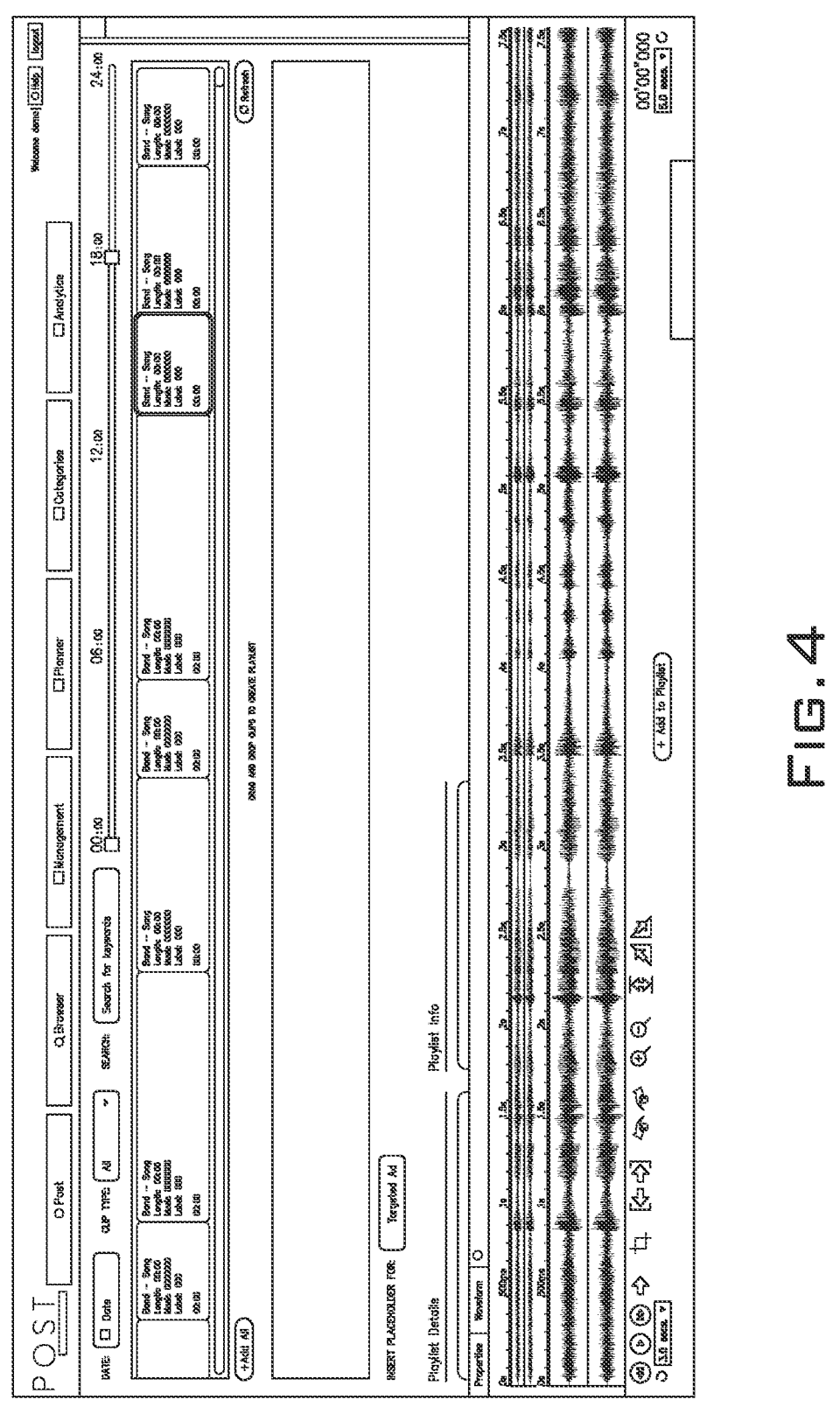

The dashboard, as viewed in FIG. 4 allows an authorized administrator to make changes to which feed segments are visible to each individual user on the system. The "administrator" is a set of instructions or person who is up-stream of the feed clip collection and production process and has the ability to take control of this process, whereas a "user", and in particular an "end-user" may also be an audience member, ie., an entity or person downstream, who may participate in the social web-site or media based communications or to whom the results of the inventive process (i.e. the pod-cast or on-demand segment) is supplied on a device. The web-based admin control panel also includes options to override the automatic production of the new material to create the secondary production, where an administrative user may edit, combine or merge or un-merge certain items out of a template production. The encoder 20 is a tone generator which may be configured to generate a tone which is in-audible to the final audience. The tone generator may also be configured to add undetectable marked transmission of noise. The invention also includes a production system 30, which is hardware having machine readable code and the code, or software system, which preferably resides in the cloud 32 but which interfaces with the capture system by means of the Internet.

Using a web-based admin control panel, the broadcast station administrator can also add new sources for the production system to collect additional information for the final production, for example, a report on the weather in a specific location, or the top song of a particular genre.

The system may use ad invocation. In the past, advertizers have only been able to participate in the linear live part of the broadcast, but advances have permitted advertizers to select different target listener and different part of broadcast in which to place advertisements. For example, ads directed to 13 years olds for a part of a pod-cast or 60 year olds for another part. This alleviates the former practice of having one standard place for ad insertion and allows for dynamic ad insertion in which segmented audio is available to advertizers, and which can be inserted at any point. Moreover, the technology disclosed may enable the broadcaster to validate or prove where ad content was listened to, i.e. as a proof of performance for the ad and for the content both, since the ad streams via HLS can identify where the ad was listened to. The marked 5 second segments feed stream allows the insertion at a different place since there are 5 second segments between and the ad has to be served via ICEY stream, whereas a regular pod-cast to an advertiser has a beginning and an end. The present invention is like a play-list with multiple entries because it actually serves an advertisement and the serving can be verified to confirm what was served and listened to based on back-end insertion technology and using a dynamic ability to serve the advertisement or supplemental content.

In certain aspects, the technology disclosed relates to a production system for creating a secondary production in form of an audio clip, or a multimedia clip, with audio content from a live feed stream. The production system may then be configured to receive a marked segment of a live feed stream and may comprise a machine with machine readable code configured to parse, or index, the marked feed stream into a feed clip and which is further configured to incorporate the feed clip into a secondary production by combining the audio content of the live feed stream with at least one of searchable metadata, one or more promotional material advertisements and supplemental content in different format, including video or graphic files.

In other aspects, the technology disclosed relates to a capture system receiving a live feed stream comprising at least audio content, where the capture system further comprises a marker device for encoding, in real-time, a segment of the received live feed stream by marking the segment with a marker in form of at least one of an in-audible tone, noise and/or a lightwave. By marking the segment of the received live feed stream, the marked feed stream may be adapted for subsequent parsing, or indexing, into a feed clip by the machine readable code of a machine of a production system to which the marked feed stream is transmitted.

In certain aspects, the technology disclosed relates to a system for creating a secondary production in form of an audio clip, or a multimedia clip, with audio content from a live feed stream using a marker device and combining the audio content with additional material, the system comprises:

a capture system 400 configured for receiving a live feed stream 410 comprising at least audio content, where the capture system further comprises a marker device for encoding, in real-time, a segment of the received live feed stream by marking the segment with a marker in form of at least one of an in-audible tone, noise and a lightwave; and a production system 420 configured for receiving the marked segment 412 of the live feed stream 410 and comprising a machine with machine readable code configured for parsing, or indexing, the marked feed stream into a feed clip and incorporating the feed clip into a secondary production by combining the audio content of the live feed stream with at least one of searchable metadata, one or more promotional material advertisements and supplemental content in different format, including video or graphic files. In embodiments, the production system is further configured to create the above-mentioned secondary production or content 413 to be available for at least one of download and streaming to a user device 414. In certain aspects of the technology disclosed, the production system may be provided with pre-set administer or user enabled instructions 416 and may be configured for combining the content of the marked segment of the live feed with additional material again in accordance with the pre-set administer or user enabled instructions. In other aspects, the additional material may include transcription, music or other audio selections, promotional material and advertising and the production system may be configured to produce at least one of an instant on-demand segment or pod-cast. The benefits of using the system of the technology disclosed, which enables marking of a live feed stream and then parsing, or indexing, the marked feed stream into a feed clip by also incorporating additional material, may include that a broadcast station may take a live show segment and turn it into a pod-cast on social media in a matter of seconds, where the pod-cast may include transcription, music or other audio selections, promotional material and advertising. In certain aspects, the system is configured to create a pod-cast that, in addition to the original audio content of the marked segment of the live feed stream, also includes at least one of transcriptions, music or other audio selections, promotional material and advertising. In embodiments, the production system may be configured to act on the marked feed segment by indexing, and transcribing the marked feed segments, which are linked back to the station administrator, which can add supplemental material including visual material such as jpegs, pdf, video, or advertising material using e.g. an image data base or an ad invocation service. The production component may be linked to a distribution system 120, which may be directed by the station administrator 416 where to distribute the secondary production. The production component may also be used to establish validation or proof of performance of content, including ad content served from an outside source 418, for example through ad invocation.

In certain aspects, the technology disclosed relates to a method for creating a secondary production in form of an audio clip, or a multimedia clip, with audio content from a live feed stream by using a marker and combining the audio content with additional material, the method comprising:

receiving, at a capture system, a live feed stream comprising at least audio content;

encoding, in real-time using a marking device, e.g. a tone generator, a segment of the live feed stream by marking the segment with a marker in form of at least one of an in-audible tone, noise and a lightwave, where said marker is embedded into the feed stream to facilitate the parsing of the content of the feed stream;

receiving, at a production system, the marked segment of the live feed stream; and parsing, or indexing, by using machine readable code of a machine of the production system, the marked feed stream into a feed clip; and incorporating, by using machine readable code of the machine of the production system, the feed clip into a secondary production, where the above step of incorporating the feed clip into the second production further includes incorporating additional material in form of at least one of searchable metadata, one or more promotional material advertisements, and supplemental content in different format, including video or graphic files, and wherein said secondary production is created to be available for at least one of download and streaming to a user device. In certain aspects of the method of the technology disclosed, the feed clip may be combined in the production system production with additional material again in accordance with pre-set administer or user enabled instructions. In other aspects, the additional material may include transcription, music or other audio selections, promotional material and advertising to produce at least one of an instant on-demand segment or pod-cast. An example advantage of using the method of the technology disclosed, enabling marking of a live feed stream and parsing, or indexing, the marked feed stream into a feed clip by incorporating additional material, may include that broadcast stations may take a live show segment and turn it into a pod-cast on social media in a matter of seconds. In certain aspects, the method of the technology disclosed provides a solution for instantly creating a pod-cast from a live show segment that may, in addition to the original audio content of the marked segment of the live feed stream, also include at least one of transcriptions, music or other audio selections, promotional material and advertising. In embodiments, the method of the technology disclosed may include acting on the marked feed segment by indexing, and transcribing the marked feed segments, which may be linked back to the station administrator, which can add supplemental material including visual material such as jpegs, pdf, video, or advertising material by using e.g. an image data base or an ad invocation service.

In an exemplary data processing system upon which the methods and apparatuses of the invention may be implemented, the hardware of a capture system may be one and the same with the hardware of the production system, and may be individual desk-top or mobile based devices or may be cloud based devices accessible through a user interface device. It will also be appreciated that network computers and other data processing systems, which have fewer or more components, may also be used and may exist as individual components or as components of a larger system connected through the internet or the cloud. The data processing system of the present invention may, for example, be a workstation, or a personal computer (PC) running a Windows operating system, or an Apple Macintosh computer. As an example of the individual hardware (which may be considered as to the architecture in the event that the components reside in the cloud) with which the present invention can be used, the data processing system includes a system bus coupled to a microprocessor, a ROM, a volatile RAM, and a non-volatile memory 424. The microprocessor, which may be a processor designed to execute any instruction set, is coupled to cache memory. The system bus interconnects these various components together and also interconnects components, to a display controller and display device or other input devices including AI or voice activated assistants, and to peripheral devices such as input/output (I/O) devices, such as keyboards, modems, network interfaces, printers, scanners, video cameras and other devices which are well known in the art. Typically, the I/O devices are coupled to the system bus through input/output controllers. The volatile RAM is typically implemented as dynamic RAM (DRAM) which currently requires power continually in order to refresh or maintain the data in the memory. The non-volatile memory is typically a magnetic hard drive or a magnetic optical drive or an optical drive or a DVD RAM or other type of memory systems which maintain data even after power is removed from the system. Typically, the non-volatile memory will also be a random access memory although this is not required. While it is illustrated that the non-volatile memory is a local device coupled directly to the rest of the components in the data processing system, the present invention may utilize a non-volatile memory which is remote from the system, such as a network storage device which is coupled to the data processing system through a network interface including for example through the "cloud". The system bus may include one or more buses connected to each other through various bridges, controllers and/or adapters. The I/O controller may include a USB (Universal Serial Bus) adapter for controlling USB peripherals, and/or an IEEE-bus adapter for controlling IEEE-peripherals.

It will be apparent from this description that aspects of the present invention may comprise in software, hardware, firmware, or in combination thereof. Further, the invention may be executed using a computer system, tablet, PDA, phone, television or other data processing system in response to its processor, such as a microprocessor, executing sequences of instructions contained in a memory, such as ROM, volatile RAM, non-volatile memory, cache, or a remote device. In various embodiments, hardwired circuitry may be used in combination with software instructions to implement the present invention. Thus, the invention is not limited to any specific combination of hardware circuitry and software or to any particular source for the instructions executed by the data processing system. In addition, throughout this description, various functions and operations are described as being performed by or caused by software or by hardware so as to simplify description. However, it will be understood that the functions result from execution of code by a processor, such as a microprocessor.

The invention also relates to the aggregated apparatus for performing the operations of the invention. This includes the encoder, which is a piece of hardware that marks the stream, and that may for example, be included with the microphone 16, or which may be a separate piece of equipment. This apparatus may be specially constructed for the invention, or it may comprise a general purpose computer selectively activated or reconfigured by a computer program stored in the computer. This computer program may be stored or transmitted in a computer-readable medium which can be used to store software and data which when executed by a data processing system, such as data processing system, causes the system to perform the various tasks of the present invention. This executable software and data may be stored in various places including for example ROM, volatile RAM, non-volatile memory, and/or cache. All or part of this software and/or data may be stored in any one of these storage devices. A computer-readable medium may include any mechanism that collects or provides (including for example, storing and/or transmitting) information in a form accessible by a machine such as for example, a computer, network device, personal digital assistant, tablet, phone, manufacturing tool, camera, or any device with a set of one or more processors. For example, a machine readable medium includes recordable/non-recordable media such as, but not limited to, a computer-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a computer-readable transmission medium such as, but not limited to, any type of electrical, optical, acoustical or other form of propagated signals (e.g., carrier waves, infrared signals, digital signals, etc.).

Additionally, it will be understood that the various embodiments described herein may be implemented with data processing systems, which have more or fewer components than the illustrated system. For example, such data processing systems may include a cellular telephone or a personal digital assistant (PDA) or an entertainment system or a media player or a consumer electronic device, each of which can be used to implement one or more of the embodiments of the invention. The algorithms and displays presented herein are not inherently related to any particular computing system or other apparatus. Various general purpose systems may be used with programs in accordance with the teachings herein, or it may prove convenient to construct custom apparatuses to perform the method operations. In addition, a variety of programming languages, structure and techniques may be used to implement the teachings of the invention as described herein.

Some portions of the detailed description as set forth above are presented in terms of algorithms and symbolic representations of operations on data bits within a computer memory. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood that throughout the description, discussions utilizing terms such as "parsing", "encoding", "decoding", "filing", "transmitting" "distributing", "storing", "filing", "archiving", "scanning" or "filtering" or "calculating" or "collecting" or "tabulating" or "categorizing" or "displaying", refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices and which enables the further use, such as by visual display.

The invention may include various operations as set forth above or more or fewer operations in an order, which is different from the order described herein so long as the end purpose can be attained. The described operations may be provided in machine-executable instructions, which cause a general-purpose or special-purpose processor to perform certain tasks. Alternatively, these operations may be performed by hardware components that contain hardwired logic for performing the operations, or by any combination of programmed computer components and custom hardware components.

Thus, the software system of the present invention system includes software that permits a radio station' studio automation system to interact via an external communication means such as the web, with a separate server which hosts the process of reception of the transmission of the marked feed stream including the feed clips, filing and storage of the feed stream (including for an extended period of time, such as 30-90 days or even 1 or 2 years) and of the feed clips, (likewise for a defined period of time, such as 30-60 days), and the secondary production creation and distribution. Specifically, the software monitors a definable location for production information, such as new log exports, which are generated by the radio station automation system or a music scheduling program. The system and methods of the technology disclosed allows for various features including ad invocation, transcription of the marked feed stream, analytics, proof of performance for content and inserted content such as ads, metadata attachment, combination of supplemental content in different format, including video or graphic files and linking to outside files. In aspects of the technology disclosed, a distribution system linked via an IP network to the production system may be used. In certain aspects, the distribution system may be configured to distribute a created secondary production in accordance with a set of user enabled instructions, "user enabled distribution instructions", whereby the secondary production is available for download or streamed to a user device.

The broadcast station stream is captured by a marker device such as a microphone and is transmitted, or fed, to a production system that typically resides off location, such as part of a cloud-based production system. Thus a separate server advantageously conducts the marked stream induction and the station interface and stores the marked content. This hardware and software system receives data for the broadcast station, which it uses internally, manipulates, for example in accordance with an organizational scheme that has been previously set-up to parse, edit, combine, and compile contents to produce a secondary production, which is then forwarded back to a station server separate server via a secure web-based API. The software queries the web-based API which provides XML data to convey the secondary production system using HTTP GET via TCP-IP which are sent back from the separate production system to the station software system, which copies the contents of the analog or digital secondary production file to a new file ("placeholder" file) using a file location, for example for publication on a station web-site, which causes the station automation system to import the secondary production file. The system is not limited to the use of a specific type of method of managing the file transfer and secondary production exportation and can encompass other methods of transferring information. To the broadcast radio station automation system or to social media, including, for example FaceBook, Twitter, Instagram, and Pinterest to name a few.

The software system of the present invention uses a surrogate or placeholder for a decoded feed clip with meta data which is an entry in a file which defines the template for the secondary production of the present invention and that will later be replaced by a feed clip generated in accordance with the present invention. The file is a text-based file which uses row and comma format for data that represents the on-air schedule for a broadcast station for a given period, such as a broadcast day. The invention subsequently copies the selection's file contents into this placeholder file to cause that selection to be incorporated into the template for the creation of the secondary production file.

The broadcast automation system generally sends the "encoded feed stream" data in a single format, but the software of the present invention has the ability to forward this information in a variety of different formats to multiple sources using a variety of protocols, such as XML over TCP/IP including metadata.

The software production system 10 of the present invention includes the following major components, each responsible for a separate process, that can be combined together to create the functionality required to enable the broadcast station automation system to make a secondary production available to an audience by on-demand, push to social media or down-loadable.

The first component is a component which receives and monitors a feed stream (transmitted from the broadcast radio station, for example, by means of the interaction of a broadcast interaction system), for the encoded section and which then creates a feed clip from the feed stream and decodes the feed clip to remove the marker, such as the in-audible tone that has been inserted by the broadcast radio station to book-mark a section of the live stream between mic on and mic off events. The system is set to recognize the mic on mic off events and uses these benchmarks to parse the clip, unless a different time period of begin and end are defined in the system. Examples of automation systems which can be used with the present invention include those manufactured by Scott Studios/dMark/Google/Wide Orbit as defined by these automation manufacturers. Other automation system manufacturer's music import format is likewise supported by the present invention.

As a second component, after the production system has received the live feed stream data from the broadcast station automation system 16, manipulated it by parsing it into feed clips as described, it optionally adds additional material in accordance with the instructions included in a pre-set template to make a secondary production. In this component, the feed clip is stored as a retrievable selection until it is copied and used. In this case, the production system follows live or pre-assigned instructions for example, to replace a placeholder file with the feed clip in a template that includes additional material, such as audio or video selections, graphic or visual content, promotional material or advertising. The additional material can be tailored for individual uses, including analytics, i.e. according to demographic definitions, such as the geographic location of a user or broadcast call sign, or the end use demographic for particular users or audiences. Alternatively, a producer can incorporate the feed clip into an entirely different secondary production which is not based on a template but created from scratch.

As mentioned above, the system may also attach metadata. It has become increasing common for broadcast audiences to expect to get additional information, such as the "Now Playing" information relating to the Station ID, song title, and artist, displayed on late model vehicle entertainment systems. Metadata and actions via an identifier are typically used in the broadcast industry to link audio (namely audio signals, including music, sound tracks of audio and video or visual works, voice recordings, and other media objects including video, still images, and graphical models, etc. An identifier attached to an audio signal is used to connect that signal with metadata and/or programmatic or device actions. The terms "media object" and "audio object" refer herein to an electronic form of a media signal and audio signal, respectively. The linking of media signals applies to objects that are transmitted over wire networks (such as a computer network), wireless networks (such as a wireless telephone network), and broadcast (AM, FM, digital broadcast, etc.).

There are a number of ways to associate an identifier with an audio object, including the insertion in the form of a numeric or alphanumeric code (e.g., binary or M-ary code) in an electronic file in which the audio is stored or to associate the identifier by embedding it as auxiliary data in the audio signal using steganographic methods, such as digital watermarking or other data hiding techniques. Alternatively, the identifier can be derived from the audio signal, the table of contents, the file system structure, or its container (e.g., an electronic file or physical package for data like flash memory, Digital Versatile Disk (DVD), minidisk, or compact disk (CD). This physical media may have identifying characteristics, such as a unique identifier or encoded metadata, or other attributes from which an identifier can be derived (e.g., CD disk wobble).

When the identifier is associated with metadata or actions in this way, it transforms the media object into a "linked" object where the identifier travels with the object through distribution, including in some cases, through physical distribution in packaged media and through electronic distribution (broadcast or network communication). The identifier may travel within the same band as the audio object, such as a watermark, or via a separate band, such as a file header or footer or separate broadcast band. A decoding device or programmatic process extracts the identifier from the object and uses it to retrieve related data or actions (typically known in the industry as "metadata"). In the case of an audio object, like a song, the metadata often includes the title, artist, lyrics, copyright owner, sound recording owner, information about buying or sampling opportunities and URLs to this type of data as well as web sites and other programs and devices. Linked actions include device or programmatic processes for electronically establishing a license, transferring content (either streaming or download), sending an email, and recording marketing data about a transaction. The identifier allows an interested party to get more information about the music and to buy more music. From the perspective of the artists and record labels, the identifier provides an additional opportunity to promote their music and sell content and concert tickets.

In addition, in some implementations where identifier linking transactions are monitored, it enables the vendors of music to gather data about electronic transactions triggered by the link. For example, a user ID or other context information may then be recorded when the identifier is extracted and used to trigger a transaction. Artists can link their music to information about themselves and provide electronic buying opportunities for promotion of their music and associated merchandise. Rights holding organizations can use the link to monitor rights, licensing opportunities, and playing and distribution of copies of the music. Record labels can link their music to information about the artist, the label and electronic buying opportunities to sample and buy additional music (via download or streaming delivery over a wire or wireless network). Broadcasters, including radio stations can use the linking capability to bring users to their web sites, creating advertising revenue, to provide electronic buying opportunities.

The identifier may identify the media object in which it is embedded, or entities, things or actions other than that particular media object. One type of identifier is an object ID that identifies an audio object. This identifier may be a number associated with the object, such as its International Standard Recording Code (ISRC). Another type of identifier is distributor ID that identifies the distributor of the audio object. Another type of identifier is a broadcaster ID that identifiers the broadcaster of the audio object. Of course, more than one identifier may be encoded into an audio object or its container. In the event that an object ID is not encoded with an audio object, but instead, a distributor or broadcaster identifier is encoded with the object, other context information, such as the time of play back or distribution or location of distribution, may be used to identify the audio object as part of the linking process. An example is a radio station that marks its broadcasts with a station ID and maintains a playlist database with the air times of each audio object. At decoding time, the station ID is extracted and used along with context information such as the air time of the audio object to look up the audio object or its corresponding metadata and actions. This approach enables the linking system to provide audio object specific metadata or actions even without requiring a unique object identifier in every audio object.

A third component of the system is a publication component that forwards the secondary production (or a link to the secondary production) to the broadcast radio automation system via a web-based API. The information is formatted, for example in XML, and transferred via a TCP/IP connection as a stream of bytes. In one embodiment, a software linking system re-formats this secondary production data, and sends it to the system via HTTP POST via a web-based API. The data is sent along with authorization credentials (username and password) for security. The HTTP POST parameters used by this API are:

stationId—A string of characters that identifies the station to the audience participation system auth_username—A string of characters representing the username used for authentication auth_password—A string of characters representing the password user for authentication selectionID—A string of characters that contains the category and cart number of the selection from the broadcast station automation system. These two pieces of data combined identify the selection in the automation system. These two pieces of information are combined into one string and separated by a forward-slash ("/"). The category comes first, followed by the cart number.

Example: S01/0865 stationcallsign—Radio Station personnel creates the template including a secondary production schedule for a given time period. Production system template commands are contained within this schedule.

The template instructions are exported to a text file on the file system. The software link system, while monitoring for new log export files, discovers the new export file and reads it from the file system and sends a log export file to a broadcast station automation system API via the HTTP interface. The connection is left open so that the broadcast automation system server can send information back, read the template commands from the export file, and replaces the necessary commands with placeholder files, which the software link will later change with the feed clips. The updated export file (with new placeholders) is sent back to the software link system 10 application through the still-open HTTP connection, which then closes the connection.

The secondary production creation system of the present invention system 10 sends the new export feed clip file back to the file system so that the broadcast station automation system can import it into a template which it creates or alternatively it is incorporated into a template as the secondary production and distributed or published as directed by the radio station system.

The system of the present invention includes analytics 426, meaning the ability to tailor the criteria for the production process as to the audience make-up or complexion, demographic, geolocation and participation value, as well as content based considerations, such as flow and provider identity. It also provides security measures to maximize both the data security of the internal automation system of the provider and the flow of information via the social media to the audience members.

List of itemized example embodiments of the technology disclosed:

A method according to a first example embodiment of the technology disclosed for creating an on-demand or downloadable web-cast incorporating audio feed from a broadcast radio station having a radio automation system and administrator, the method comprising:

encoding the audio feed;

receiving, at a production system, the encoded audio feed;

editing the encoded audio feed; and creating a secondary production by combining the audio clip with additional material.

In a method according to a second embodiment, the production system in the first example embodiment above is further provided with pre-selected instructions and the editing in the above-mentioned first embodiment is determined by the pre-selected instructions and includes the actions of decoding the encoded feed, parsing, or indexing, an audio clip from the decoded feed and combining the audio clip with additional material to create the secondary production.

In a method according to a third embodiment, the secondary production in any of the first and second embodiments above is distributed to at least one of the broadcast radio station and to social media for listening or viewing by an audience member.

In a method according to a fourth embodiment, a tone generator is activated to emit a tone that encodes the audio feed at a time selected by the broadcast radio station administrator, thereby creating the encoded audio feed.

In certain aspects, the technology disclosed describes a production creation system for creating and providing a downloadable secondary production to a presentation device of a user comprising:

a capture system that captures a live feed stream and including a microphone or audio source encoder having an on control and an off control that captures a live feed stream and is recorded in feed segments initiated by the on control and ended by the off control, a decoder which marks a segment of the feed stream, and a display screen which displays a wave form of the marked feed segment;

a production system linked through the internet to the capture system and which receives the marked feed stream from the capture system and includes a machine having machine readable code to enable the machine to one or more of receive, decode, store, catalog and manipulate the marked feed stream segment in accordance with a set of user enabled production instructions, where the manipulation by the production system includes parsing the marked feed stream into a feed clip and incorporating the feed clip into a secondary production by adding additional material, and transmitting the secondary production to a distribution system; and a distribution system comprising a machine with machine readable code which is linked, e.g. via an IP network such as the internet, to the production system and which is configured to distribute the secondary production in accordance with user enabled instruction in accordance with a set of user enabled distribution instructions, whereby the secondary production is available for download or upload or streamed to a user device.

While in accordance with the patent statutes the best mode and preferred embodiment have been set forth, the scope of the invention is not limited thereto, but rather by the scope of the attached claims.

What is claimed is:

1. A system for analyzing content consumption on a user device of a created secondary production comprising:
   a capture system having a GPIO device that captures a feed stream from a broadcast live stream having an audio and the GPIO device includes a microphone or audio source encoder having an on control and an off control that captures the broadcast live feed stream and records it in feed segments initiated by the on control and ended by the off control, a decoder which has an activation component which marks a segment of the feed stream, and a display screen which displays a wave form of the marked feed segment;
   a marker system linked to the capture system and which has an encoder which marks a segment of the feed stream using the GIPO device into segments through the use of energy pulses to thereby produce a marked feed segment of from 0.5 to 30 seconds;
   a production system linked to the marker system and which receives the marked feed stream from the capture system and includes a machine having machine readable code to enable the machine to act on the marked feed stream segment in accordance with a set of user enabled production instructions, where the manipulation by the production system includes parsing the marked feed stream into a feed clip and incorporating the feed clip into a secondary production and transmitting the secondary production to a distribution system;
   a content insertion system including a machine having machine readable code and which is linked to the production system and which selectively incorporates additional content to the secondary production according to a set of user enabled content insertion instruction and which accounts for each instance of insertion of additional content;
   the distribution system comprising a machine with machine readable code which is linked via IP network to the production system which distributes the secondary production in accordance with a set of user enabled distribution instructions whereby the secondary production is available for download or streamed to a user device; and
   wherein the accounting by the content insertion system of the incorporation of additional content is aggregated to analyze content consumption.

2. A system for analyzing content consumption on a user device of a created secondary production as set forth in 1 wherein the act of the production system on the marked feed stream segment comprises one or more of receiving, decoding, storing, cataloging and manipulating the marked feed stream segment.

3. A system for analyzing content consumption incorporated into a created secondary production comprising:
   a capture system comprising a GPIO device having a touch activated on/off device that captures a feed stream having an audio component;
   the GPIO device including a marker system linked to the capture system and which has an encoder activated by the touch activated on/off device which marks a segment of the feed stream;
   a production system linked to the marker system and which receives the marked feed stream from the capture system and includes a machine having machine readable code to enable the machine to one r more of receive, decode, store, catalog and manipulate, the marked feed stream segment in accordance with a set of user enabled production instructions, where the manipulation by the production system includes parsing the marked feed stream into a feed clip and incorporating the feed clip into a secondary production to transmitting the secondary production to a distribution system;
   a content insertion system which is linked to the production system and which incorporates additional content to the secondary production;
   the distribution system comprising a machine with machine readable code which is linked via IP network to the production system which distributes the secondary; and
   an analytic system linked to the distribution system which accounts for content insertion into the secondary production.

4. A system for analyzing content consumption incorporated into a created secondary production as set forth in claim 3 which can be used to validate at least one of the quantity of use or another characteristic of use or of users of the of the additional content on a case by case basis.

5. A system for analyzing content consumption incorporated into a created secondary production as set forth in claim 3 wherein the content insertion system inserts advertising material or metadata.

\* \* \* \* \*